United States Patent [19]
Pitner

[11] 3,867,050
[45] Feb. 18, 1975

[54] ASSEMBLY OF A CONNECTING ELEMENT AND A TORQUE TRANSMITTING ELEMENT

[75] Inventor: Alfred Pitner, Paris, France

[73] Assignee: Nadella, Rueil-Malmaison, France; a part interest

[22] Filed: Apr. 21, 1972

[21] Appl. No.: 246,229

Related U.S. Application Data

[63] Continuation-in-part of Ser. No. 77,911, Oct. 5, 1970, Pat. No. 3,804,541.

[30] Foreign Application Priority Data
Nov. 17, 1969 France .............................. 69.39423

[52] U.S. Cl...................... 403/373, 403/383, 64/17
[51] Int. Cl.............................................. F16b 2/02
[58] Field of Search....... 287/53 R, 52.02, 118, 110; 64/17 R, 17 A; 403/344, 373, 383

[56] References Cited
OTHER PUBLICATIONS
German Printed Application, 1,283,039, Birfield Engineering, Feb. 20, 1969.

*Primary Examiner*—Andrew V. Kundral
*Attorney, Agent, or Firm*—Robert E. Burns; Emmanuel J. Lobato; Bruce L. Adams

[57] ABSTRACT

Assembly of a shaft and a connecting element comprising a split collar of sheet metal having ear portions. The split is wide enough to allow the shaft to pass radially therethrough. An intermediate member is disposed in the split and bears against the shaft. A bolt and nut tightening means extends through the ear portions and the intermediate member co-operates with faces on the ear portions and/or with a face on the tightening means. The arrangement is such that a relative displacement between the ear portions, the intermediate member and the tightening means causes the shaft to be gripped inside the collar.

11 Claims, 16 Drawing Figures

PATENTED FEB 18 1975 3,867,050

PATENTED FEB 18 1975 3,867,050

PATENTED FEB 18 1975　　3,867,050

ASSEMBLY OF A CONNECTING ELEMENT AND A TORQUE TRANSMITTING ELEMENT

This application is a continuation-in-part of my application Ser. No. 77,911, filed Oct. 5, 1970 now U.S. Pat. No. 3,804,541.

The present invention relates to an assembly of a shaft with the collar of a connecting element, as a yoke of a universal joint, which ensures a play-free transmission between the collar and the shaft.

In such an assembly, when any relative axial movement between the parts is impossible, for example owing to their size and position, it must be possible to place the shaft in the collar by a transverse movement and this requires that the collar have a longitudinal slot whose width is determined by the transverse dimensions of the shaft. The fixing of the shaft in the collar, which is usually forged or cast, requires extensive machining, that is; the cutting away of material, to form the faces which co-act with faces on the shaft with a precision which is all the higher that usually any deformation of the parts likely to ensure a good contact of the drive transmitting faces is practically impossible. Moreover, to complete the missing part of the profile, an attached bar or cap is employed which also requires precise machining to ensure a good fixing of the shaft to the collar.

The object of the invention is to avoid these drawbacks by the use of a collar and sheet-metal auxiliary elements which can consequently be put into shape as a whole without cutting away material and are, moreover, deformable, which ensures an intimate contact between the faces and consequently an improved transmission of the drive with a substantial reduction in manufacturing and assembly costs.

The invention provides an assembly of a shaft or other torque transmitting element and a connecting element having a split collar which partly surrounds the shaft, the width of the split being sufficient to permit positioning the collar by a relative radial displacement of the shaft and the collar, wherein the collar is cold-formed from sheet metal and terminates in two ear portions through which extend tightening means and with which an intermediate holding member is in contact, said intermediate member having a face which marries up with the shaft and at least one other face which co-operates with a part of the face of the ear portions and/or of the tightening means, whereby a relative displacement between the ear portions, the intermediate member and the tightening means results in the shaft being gripped inside the collar.

In combination with the ear portions, which are disposed roughly parallel to each other, the intermediate member can have a U- or V-shape, the two branches of which terminate in an oblique face in contact with an inner face of the respective ear portions which has the same obliquity, the obliquity being such that resiliently urging the ear portions towards each other, for example by screwing the tightening means extending through the ear portions, produces a radial compression of the base of the U or V in contact with the shaft.

The intermediate member can also have a generally flat shape, with if desired a slight curvature so that, under the action of the tightening means connected to the ear portions or to the whole of the collar, there result, both for said intermediate member and said collar, deformations producing an intimate contact between the shaft and the collar.

The intermediate member can also be directly inserted between the tightening means and the shaft, two of the faces in mutual contact creating by a relative displacement a wedging effect which tends to radially grip the shaft inside the collar.

The aforementioned wedging effect can be due to tightening means in the form of a key, known as a cotter-pin, whose oblique face co-operates with a plane face which is formed on the intermediate member and is parallel to the axis of the shaft. It is also possible to employ, in combination with cylindrical tightening means a wedged-shape member which produces the radial compression of the shaft by a longitudinal displacement with respect to the shaft.

In an advantageous arrangement of the collar a stiffening bridge across the split is provided axially adjacent the part of the collar clamped to the shaft.

The assembly according to the invention is in particular applicable to a yoke for a universal joint constructed in accordance with the teachings of U.S. Pat. No. 3,478,540 and U.S. Pat. Nos. 3,501,928 and 3,529,344. In such an application, the assembly, and especially that including a stiffening bridge on the collar, results in a precise transmission of static or dynamic torque with no play, hard point or resilient yielding of the branches of the yoke.

Further features and advantages of the invention will be apparent from the ensuing description with reference to the accompanying drawings.

Figure 1:
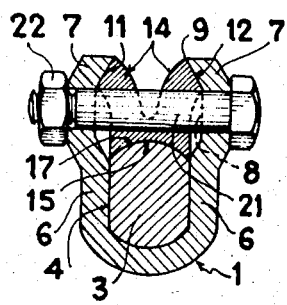
FIG. 1 is a cross-sectional view of the assembly of a collar of a universal joint yoke and a shaft.
Figure 2:
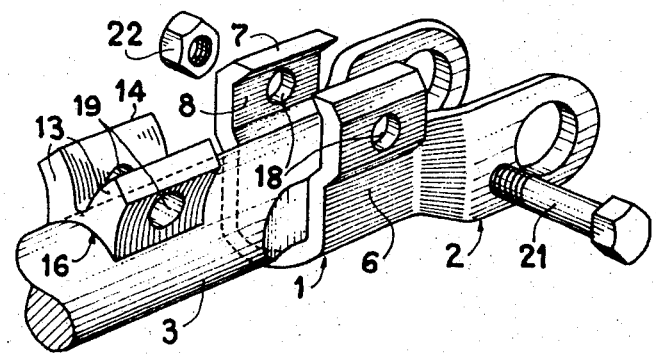
FIG. 2 is an exploded perspective view of the parts shown in FIG. 1 before assembly.

It will be observed that in all the Figures of the drawing, the collar 1, which has a generally U- or V-sectioned shape, is simply and economically produced by blanking, rolling and/or bending a blank of sheet metal so that the connecting element, for example the universal joint yoke 2 shown in FIGS. 1 and 2, can be entirely produced by these operations, as described in U.S. Pat. Nos. 3,501,928 and 3,529,344. The intermediate holding member 14 or 24 shown in FIGS. 1 and 3 can also be produced by blanking and bending a blank of sheet metal. This affords with sufficient precision the desired advantage very cheaply owing to the utilisation on presses of a suitable tooling which operates more or less automatically, the sole possible machining operations being restricted to slight rectifications so as to obtain, for example in the case of splines, more precise profiles, the deformation made possible by the utilization of sheet metal at the moment of bringing into action the tightening means ensuring the intimate contact necessary for the correct performance of the connection.

In FIG. 1, the collar 1 has the generally U-sectioned shape of a universal joint yoke 2 and is assembled with a shaft 3 having two parallel flat faces 4. The side portions 6 of the collar 1 are extended in the form of two ear portions 7 which have such shape that their inner face has the shape of a shallow recess 8 so that the width of the gap or split 9 defined by the two ear portions permits the assembly of the collar with the shaft 3 by a relative radial displacement with a resilient deformation of the two ear portions 7 and, moreover, forms an inner oblique face 11 on the ear portions which is adjacent the end 9 and complementary to a face 12 which has the same obliquity and is located at the end of each of the branches 13 of an intermediate member 14. The latter has a V-sectioned shape whose base has a concave face 15 which marries up with the cylindrical face 17 of the shaft. The two ear portions 7 and the two branches 13 of the intermediate member 14 have aligned apertures 18,18 and 19,19 through which extends a bolt or screw 21 whose screwthreaded end receives a nut 22. The tightening of this screw has for effect to resiliently deform the two ear portions 7 by urging them inwardly towards each other so that the displacement of the oblique faces 11 of the ear portions 7, applied against the oblique ends 12 of the intermediate member 14, radially presses the concave face 15 of the base of the intermediate member in contact with the shaft 3 and thus secures the shaft without play in the collar 1 jointly with the clamping effect exerted by the side walls 6 of the collar on the flat faces 4 of the shaft.

Figure 3:
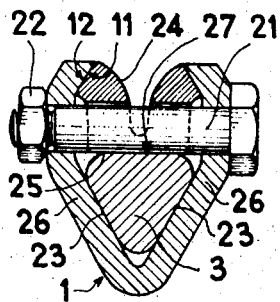
FIGS. 3 and 4 are respectively cross-sectional views of other embodiments of the assembly.

Whereas in FIG. 1 the shaft engaged in the collar 1 has a cylindro-prismatic cross-sectional shape, the shaft shown in FIG. 3 has a purely prismatic and more precisely a triangular-prismatic shape having two lateral faces 23 in contact with the V-shaped side portions 26 of the collar 1. The third lateral face 27 of the shaft 3 radially engages the face of the plane base 25 of the intermediate member 24. The shaft 3 is locked in the collar 1, under the same conditions as in the embodiment shown in FIG. 1, by the tightening of the bolt or screw 21.

Figure 4:
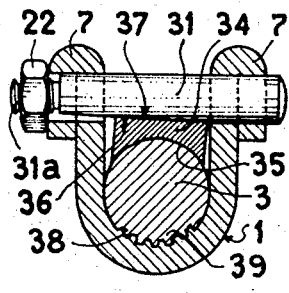

In FIG. 4, the collar 1 has a U-shaped section and includes ear portions 7 having a double thickness owing to the fact that the sheet metal of the collar is bent onto itself in these parts. The shaft 3 has a generally cylindrical cross-sectional shape and the intermediate member 34, which has, as in the embodiment shown in FIG. 1, a cylindrical face 35 bearing against the shaft 3, is inserted directly between the shaft and the tightening means. The latter are in the form of a key or cotter-pin 31 as defined in French standards AFNOR R 321-01, that is, the pin 31 has at the end of a cylindrical body a screw thread $31^a$ formed in a portion having a smaller diameter and an oblique plane face 36 applied against a plane face 37 which is provided on the intermediate member 34 and is parallel to the axis of the shaft 3.

The screwing of the nut 22 on the screwthreaded end portion $31^a$ of the key 31 grips the shaft 3 inside the collar 1, by the effect of the two oblique plane faces 36, 37. The fixing of the shaft is completed by co-acting splines 38, 39 respectively formed in the cylindrical inner face of the collar 1 and in the adjacent face of the shaft 3. The splines have such position and orientation that it is possible to position the collar with respect to the shaft 3 by a transverse movement of the collar causing the shaft to pass through the gap defined by the ear portions 7.

Figure 5:
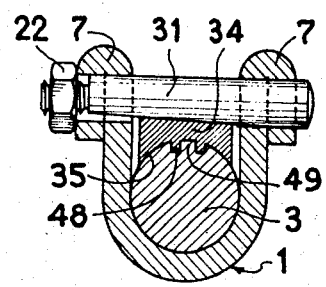
FIG. 5 is a view of a modification of the assembly shown in FIG. 4.

In the modification shown in FIG. 5, the fixing of the shaft is completed by co-acting splines 48, 49 respectively formed in the cylindrical face 35 of the intermediate member 34 and in the upper or corresponding part of the shaft 3. These splines extend longitudinally and are easier to produce, since the broaching operation on the collar required in the embodiment shown in FIG. 1 is avoided. The finished shape can be given to the intermediate member 34 without cutting away material.

Figure 6:
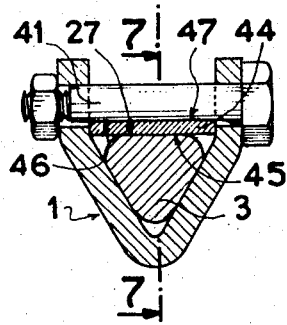
FIG. 6 is a view of another embodiment of the assembly.

In FIG. 6, the collar has a V-shaped section such as that shown in FIG. 3 and the shaft 3 has a triangular cross-sectional shape. The tightening means is a screw or bolt 41 having a flat face 46 parallel to the axis of the screw. The intermediate member is constituted by a wedge 44 having two plane faces which are inclined with respect to each other. The face 47 is in contact with the flat face 46 of the screw 41 and the face 45 is applied against the adjacent lateral face 27 of the prismatic shaft 3.

Figure 7:
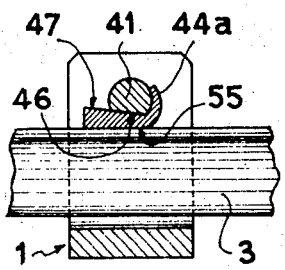
FIG. 7 is a sectional view taken along line 7—7 of FIG. 6.

The intermediate member 44 is normally placed in position after introduction of the tightening screw 41 and its final position is reached by a longitudinal displacement with respect to the shaft, for example produced by means of a hammer, which has for effect to grip the shaft 3 inside the collar 1. In order that the wedge 44 be held in its final position, its narrower end $44^a$ constitutes a tongue portion which is bent into contact with the cylindrical face of the screw as shown in FIG. 7.

Figure 8:
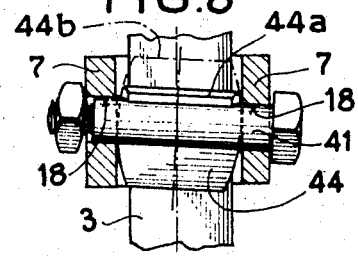
FIG. 8 is a plan view showing the convex shape of the edges of the intermediate member of the embodiment shown in FIG. 6.

FIG. 8 shows that the edges $44^b$ of the wedge 44 have a cylindrical convex shape whereby the wedge 44 can undergo slight angular displacements about an axis perpendicular to the axis of the shaft and perpendicular to the axis of the screw 41 while remaining in contact with the inner faces of ear portions 7. This angular displacement allows the flat face 46 of the screw 41 to remain in coincidence with the plane face 47 of the wedge 44 should the apertures 18 of the ear portions 7 through which the screw 41 extends be offset from each other, the angular displacement of the wedge 44 thus compensating any lack of alignment of the apertures 18.

Figure 9:
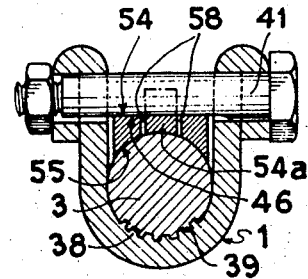
FIG. 9 is a cross-sectional view of another embodiment of the assembly.
Figure 10:
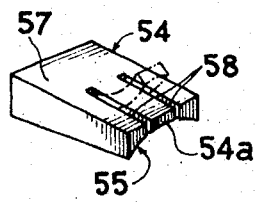
FIG. 10 is a perspective view of the shape of the intermediate member employed in the embodiment shown in FIG. 9.

In FIG. 9 the intermediate member 44 has, as the member 44 shown in FIG. 6, a generally wedge shape but, whereas its face 57 in contact with the tightening screw 41 (identical to that shown in FIG. 6) is plane, its other active face 55 has a cylindrical shape so that it marries up with the face of the shaft 3 which is also cylindrical. The retaining tongue portion 54$^a$ (FIG. 10) is defined by two longitudinal slots 58 which facilitate the bending of the tongue portion into contact with the screw 51.

Figure 11:
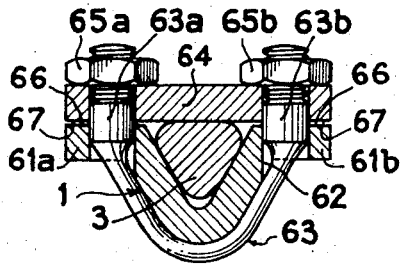
FIG. 11 is a cross-sectional view of another embodiment of the assembly.

FIG. 11 shows a collar 1 having two ear portions 61$^a$, 61$^b$ in a common plane with apertures 62 allowing the passage of two screwthreaded arms 63$^a$, 63$^b$ of a stirrup 63 which encompasses the collar. An intermediate member 64 which has, if desired, in the free state a slight concavity on the side facing away from the shaft, grips the shaft 3 inside the collar 1 under the action of two nuts 65$^a$, 65$^b$ screwed on the arms 63$^a$, 63$^b$. The branches of the collar 1 moreover have a tendency to move towards each other under the effect of the body of the stirrup 63. An extremely intimate contact is ensured in this way between all the parts transmitting the drive. The two ear portions 61$^a$, 61$^b$ can have a different orientation, for example they can be parallel to each other, and their dimensions can be reduced to suit particular arrangements depending on the contemplated drive.

Figure 12:
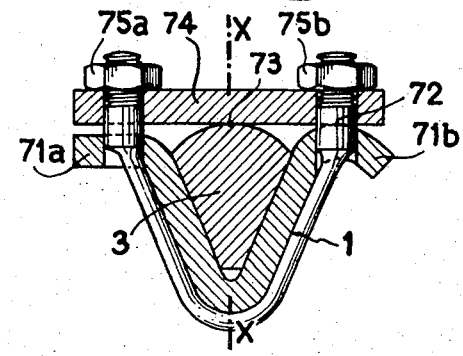
FIG. 12 is a cross-sectional view of a modification of the embodiment shown in FIG. 11.

The collar 1 shown in FIG. 12 has a V-sectioned shape the two branches of which are provided with an ear portion 71$^a$, 71$^b$. The branches are of different lengths and the ear portion 71$^b$ is slightly downwardly offset in a direction parallel to the plane X—X with respect to the other and has a slightly curved shape which defines for supporting the intermediate member 74 a convex face 72. With this arrangement it is easy to achieve in respect of the position of the face 72 a dimension substantially equal to that of the upper face 73 of the shaft 3 which has a convex shape in the presently-described embodiment. The intermediate member 74, which may be plane, is mounted in a first stage in contact with the ear portion 71$^b$. After having screwed the corresponding nut 75$^b$, the adjustment of the clamping of the shaft is achieved by deformation of the intermediate member 74 under the effect of the tightening of the other nut 75$^a$.

The curved shape of the ear portion 71$^b$ permits easily achieving, when forming the collar, a precise dimension between the face 72 and the bearing faces for the shaft in the V-shaped portion of the collar.

Figure 13:
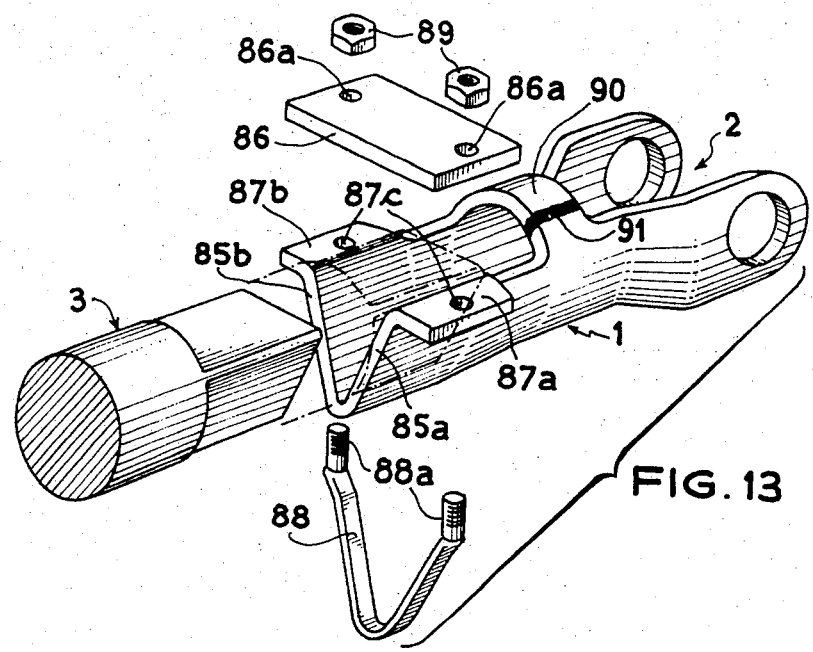
FIG. 13 is an exploded perspective view of another embodiment of an assembly according to the invention.

FIG. 13 shows a collar 1 of a connecting element in the form of a universal joint yoke 2 of cold-formed sheet metal which is adapted to be assembled with a V-sectioned shaft portion 3. The edge portions of the flanks 85$^a$ and 85$^b$ of the collar 1 are extended by two ear portions 87$^a$ and 87$^b$ adapted to receive an intermediate member 86 which may be planar as shown. The latter has two apertures 86$^a$ and the ear portions 87$^a$ and 87$^b$ have apertures 87$^c$. A V-shaped flexible stirrup or bolt 88 is adapted to fit against the flanks 85$^a$, 85$^b$ of the V-shaped collar and has screwthreaded end portions 88$^a$ adapted to extend through the pairs of apertures 86$^a$ and 87$^c$. The intermediate member 86 is clamped against the adjacent face of the shaft portion 3 by nuts 89 which bear against the member 86 and are screwed tight on the end portions 88$^a$. The assembly thus obtained is somewhat similar to that shown in cross-section in FIG. 11.

A bridge is provided on the collar 1 axially adjacent the ear portions 87$^a$, 87$^b$. This bridge is constituted by a tab portion 90 which extends across the split in the collar from one of the edge portions of the collar and is fixed by a welded joint 91 to the opposite edge portion.

Figure 14:
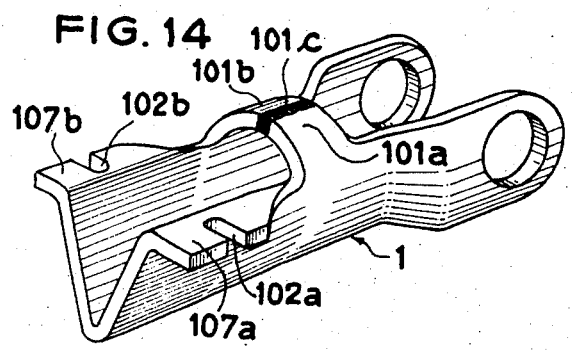
FIG. 14 is a perspective view of another embodiment of the collar according to the invention.

FIG. 14 shows a modification of the collar in which the bridge is constituted by two tab portions 101$^a$ and 101$^b$ which extend from the two edge portions of the collar 1 in the manner shown and are welded together at 101$^c$.

It will be observed that the ear portions 107$^a$ and 107$^b$ of the collar shown in FIG. 14 are smaller than the ear portions shown in FIG. 13 to save metal. In this embodiment, the end portions of the flexible bolt 88, for clamping the intermediate member 86 against the shaft portion, extend through two notches 102$^a$ and 102$^b$ in the ear portions 107$^a$ and 107$^b$ of the collar 1 before extending into the apertures 86$^a$.

Figure 15:
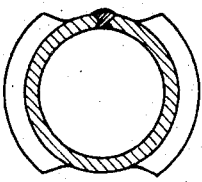
FIG. 15 is a cross-sectional view of the bridge of the collar shown in FIG. 14.

FIG. 15 shows a cross-section of the collar shown in FIG. 14 which is circular so as to allow an angular movement of the collar similar to that possible with the collars disclosed in U.S. Pat. Nos. 3,478,540; 3,501,928 and 3,529,344.

Figure 16:
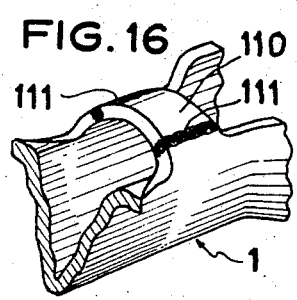
FIG. 16 is a partial perspective view of another form of the bridge of the collar according to the invention.

FIG. 16 shows a partial perspective view of a collar in which the bridge is in the form of a curved bar 110 which is welded at 111 to the two edge portions of the collar 1. Note that the bar 110 may be planar if desired.

The advantage of the bridge incorporated in the universal joint yokes shown in FIGS. 13, 14 and 16 is that it reinforces or stiffens the yoke in the region adjacent the collar 1 and precludes excessive yielding or distorsion of the branches of the yoke when it transmits torque or is subjected to torsional stress. Note that the addition of this bridge in no way deprives the connecting element or yoke assembly according to the invention of the advantages afforded by the particular features of the component parts. For example, the shaft portion 3 can still be mounted in the collar 1 by a relative radial displacement of the shaft portion and collar, since the shaft portion 3 terminates short of the bridge (see dot-dash line in FIG. 13 representing the shaft portion 3 inserted in the collar 1).

In order to avoid a limitation of the angular movement in the case of a universal joint yoke, the bridge may, while being wide so as to afford a good stiffness, have a generally part-circular shape or a shape approaching this shape.

Having now described my invention what I claim as new and desire to secure by Letters Patent is:

1. An assembly of a shaft having an axis and a face with a connecting element constituted by a cold-formed sheet metal member having a portion defining a collar which is coaxial with and encompasses the shaft and comprises two longitudinally extending edge portions defining a throughway split in the collar and two ear portions which extend from said edge portions and have surfaces, said surfaces being spaced apart from each other such distance and said split having such width as to allow the collar to be mounted on the shaft by a relative radial displacement of the shaft and collar, tightening means extending through the ear portions and having a surface, an intermediate holding member located between the ear portions and having a face which engages said face of the shaft and having at least one other face which co-operates with at least one of said surfaces, whereby a relative displacement between the ear portions, the intermediate member and the tightening means causes the shaft to be gripped inside the collar, said shaft having a portion defining a non-circular keying face and one of two component parts of the assembly consisting of said intermediate member and said collar having a portion defining a non-circular keying face keyingly engaged with the keying face of said shaft, and means defining a bridge which is axially adjacent said ear portions and rigidly interconnects said edge portions and closes one end of said split.

2. An assembly as claimed in claim 1, wherein said bridge comprises parts of said edge portions of said collar and a weld interconnecting said parts of said edge portions.

3. An assembly comprising a shaft portion having an axis and two substantially plane faces and a third face, and a connecting element constituted by a cold-formed sheet metal member having a portion defining a collar which is coaxial with and encompasses the shaft portion and comprises two longitudinally extending edge portions defining a throughway split in the collar and two ear portions which extend outwardly from said edge portions, said collar being substantially V-shaped in cross section and having two substantially plane portions engaging said substantially plane faces of the shaft portion, said ear portions being spaced apart from each other such distance and said split having such width as to allow the collar to be mounted on the shaft portion by a relative radial displacement of the shaft portion and collar, an intermediate member bearing against said third face of the shaft portion, tightening means for drawing said intermediate member toward said ear portions and clamping said intermediate member against said third face, and means defining a bridge which is axially adjacent said ear portions and rigidly interconnects said edge portions and closes one end of said split.

4. An assembly as claimed in claim 3, wherein said tightening means comprise apertures in said intermediate member and in said ear portions and a substantially V-shaped stirrup extending around said collar and having two screwthreaded end portions extending through said apertures, and nuts engaged on said screwthreaded end portions and bearing against said intermediate member on a side of said intermediate member remote from said ear portions.

5. An assembly as claimed in claim 3, wherein said bridge comprises a tab portion which is an integral part of said sheet metal member and extends from one of said edge portions across said split, and means fixing said tab portion to the other of said edge portions.

6. An assembly as claimed in claim 5, wherein said fixing means is a weld.

7. An assembly as claimed in claim 3, wherein said bridge comprises two tab portions which are integral parts of said sheet metal member and respectively extend from said edge portions across said split, and fixing means rigidly interconnecting said tab portions.

8. An assembly as claimed in claim 7, wherein said fixing means is a weld.

9. An assembly as claimed in claim 3, wherein said bridge comprises a bar extending across said split and means rigidly fixing said bar to said two edge portions.

10. An assembly as claimed in claim 9, wherein said fixing means is a weld.

11. An assembly as claimed in claim 3, wherein said collar has a circular cross-sectional shape in the region of said bridge.

* * * * *